(12) United States Patent
Jackson et al.

(10) Patent No.: US 6,554,276 B2
(45) Date of Patent: Apr. 29, 2003

(54) FLEXIBLE SHEET REVERSION USING AN OMNI-DIRECTIONAL TRANSPORT SYSTEM

(75) Inventors: Warren B. Jackson, San Francisco, CA (US); David Kalman Biegelsen, Portola Valley, CA (US); Daniel G. Bobrow, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 32 days.

(21) Appl. No.: 09/822,690

(22) Filed: Mar. 30, 2001

(65) Prior Publication Data

US 2002/0140165 A1 Oct. 3, 2002

(51) Int. Cl.[7] .............................................. B65H 39/10
(52) U.S. Cl. ....................... 271/301; 271/65; 271/186
(58) Field of Search ...................... 271/301, 65, 186; 399/401, 364, 374

(56) References Cited

U.S. PATENT DOCUMENTS

| | | | | |
|---|---|---|---|---|
| 5,415,391 A | * | 5/1995 | Wong et al. | 271/225 |
| 5,463,451 A | * | 10/1995 | Acqauviva et al. | |
| 5,486,911 A | * | 1/1996 | Rubscha et al. | |
| 5,666,629 A | * | 9/1997 | Kazoh | 399/401 |
| 6,227,532 B1 | * | 5/2001 | Bakoledis | 271/186 X |
| 6,286,828 B1 | * | 9/2001 | Adema | 271/186 |
| 6,296,246 B1 | * | 10/2001 | Boorsma | 271/186 |
| 6,409,008 B1 | * | 6/2002 | Newsome | 271/186 X |

* cited by examiner

Primary Examiner—David H. Bollinger
(74) Attorney, Agent, or Firm—Perman & Green, LLP (57) ABSTRACT

A flexible sheet handling apparatus comprising an input section for receiving the flexible sheet, a reversion section for rotating the flexible sheet about an axis of motion and an output section for transferring the rotated flexible sheet to a sheet processing system.

16 Claims, 11 Drawing Sheets

FLEXIBLE SHEET REVERSION USING AN OMNI-DIRECTIONAL TRANSPORT SYSTEM

CROSS-REFERENCE TO RELATED APPLICATIONS

The following U.S. patent application is related to subject matter disclosed or incorporated in the disclosure of U.S. patent application Ser. No. 09/822,688, filed on Mar. 30, 2001.

BACKGROUND OF THE INVENTION

1. Field of the Invention

The present invention relates generally to a printing or copying system that includes a duplexing function, and, more particularly, to a duplexing mechanism in a substrate processing system that includes a mechanism for flexible sheet reversion.

2. Brief Description of Related Developments

In the typical copying/printing apparatus, a photoconductive insulating member is typically charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the eletrostatic latent image on the photoconductive insulating surface is made visible by developing the image with developing powder referred to in the art as toner. Most development systems employ a developer material, which comprises both charged carrier particles and charged toner particles, which triboelectrically adhere to the carrier particles. During development the toner particles are attracted from the carrier particles by the charge pattern of the image areas in the photoconductive insulating area to form a powder image on the photoconductor area. This image may subsequently be transferred to a support surface such as copy paper to which it may be permanently affixed by heating and/or by the application of pressure, i.e. fusing. Following transfer of the toner image to a support surface, the photoconductive insulating member is cleaned of any residual toner that may remain thereon in preparation for the next imaging cycle.

Duplex copying, i.e. copying image information to both sides of a single sheet of paper, is an important feature in copying machines. Duplex copying is desirable because (i) it reduces the amount of paper required in copying in comparison to simplex (single side) copying, (ii) produces attractive copy sets, and (iii) can simulate the appearance of a printed book. Generally, such copying is accomplished in either one of two methods. In a first method, first side copies are produced in a reproduction processor and stacked in a duplex tray. When a set of first side copies is complete, the copies are fed out of the duplex tray and returned to the reproduction processor with an odd number of inversions in the total duplex path to receive second side image information, and subsequently passed to an output. Alternatively, first side copies may each be returned directly to the reproduction processor to receive second side copies thereon, without stacking, for example, as described in U.S. Pat. No. 4,660,963. This type of copying finds particular use with respect to copying two documents placed on a platen for sequential copying, sometimes referred to as two-up copying.

In conventional printing apparatus, sheet material or paper is handled by a series of rollers and counter rollers. A counter roller is required to generate forces normal to the tangential surface of a roller for handling the sheet. Counter rollers, unfortunately, lead to jams, paper tears, wrinkling, or other surface damage to the sheet. Aside from the undesired physical damage to the paper, it also requires service or maintenance and additional space are needed to allow access by service personnel to eliminate the jams.

Paper handling also typically requires a component of motion perpendicular to the direction of the roller motion. For example, in the case of paper registration, this cannot be accomplished with a standard set of rollers (a roller and counter roller). Traditional rollers form what is know in the field as a non-holonomic sheet transport system because only a few velocity directions are possible for the sheet at a given time. Instead, an additional set of rollers is required that release and grab the sheet. This adds to the cost, complexity, and the length of the paper path. Moreover, all this complexity is ultimately less reliable and at odds with the goal of reducing the space required to handle the paper.

Still another concern with paper handling in a printing apparatus is the ability to transition between different rates of speed in the paper path. As will be appreciated, in known printing apparatus, a sheet of paper undergoes numerous velocity accelerations and decelerations as it passes through the processing path. For example, a paper sheet proceeds from a stationary position at the supply, is increased in velocity to a first workstation, is decelerated at the first workstation, subsequently accelerated to a downstream or second workstation, decelerated at the second workstation, etc. Individual handling and increased processing are goals that require the paper sheets to be spaced apart as far as possible. Thus, fewer sheets can be handled in a specific time period.

On the other hand, increasing the spacing necessarily increases the velocity transitions of the paper. This, in turn, requires the rollers to continuously accelerate and decelerate to perform the velocity transitions or paper bending. The forces associated with the acceleration and deceleration place great stress on the roller and the associated motor systems. Additionally, the increased acceleration and deceleration require still further space in the assembly.

Still another concern is that when rollers in a conventional printing apparatus move paper, the paper is typically moved in primarily a forward direction, which is not always in the desired direction.

As xerographic and other copiers increase in speed, become more automatic, and do more duplicating, it is increasingly important to provide higher speed yet more economical, reliable and more automatic handling of the copy sheets being made by the copier. To be more economical it is important in a xerographic copier environment that has a duplicating function, to be able to move a paper sheet easily and not employ "inversion" where one roller turns a paper sheet over (i.e. exchange one face for the other) and reverses the paper sheet orientation, i.e. reverses the lead edge and trail edge orientation of the paper sheet.

With current roller technology it is difficult to revert the paper, i.e. exchange the top and bottom surfaces of the paper while maintaining the same leading edge. The primary difficulty is that with rollers, it is difficult to cause paper velocity vectors that are not parallel with the paper path. Although it is possible to construct a paper reversion system with rollers, the system would require rollers to accelerate and decelerate from process speed to zero and back for each sheet as well as posses solenoid release mechanisms. As a result of this, current duplexing machines typically invert the paper in an inverter. While this solution works, it introduces a number of added complexities and costs. First, in order to meet accuracy specifications, the paper must always be registered using the same edge. Inversion requires a duplicate set of sensors in order to accomplish trailing edge alignment. Second, because the sheets are delayed by one sheet distance in an inverter, system throughput considerations require that the paper path must be run at twice the process speed in order to maintain more than a sheet sized intercopy spacing to allow space for the returning inverted sheet. This change in velocity requires the acceleration and deceleration rollers. Third, inverters are expensive and subject to jams and wear. Hence, if paper can be reverted rather than inverted, the duplex paper-handling path can be greatly simplified.

SUMMARY OF THE INVENTION

The present invention is directed to, in a first aspect, a flexible sheet handling apparatus. In one embodiment, the apparatus comprises an input section for receiving the flexible sheet, a reversion section for rotating the flexible sheet about an axis of motion and an output section for transferring the rotated flexible sheet to a sheet processing system.

In a second aspect, the present invention is directed to a flexible sheet handling apparatus for reverting sheet in a system having at least one one-sided processing station. In one embodiment, the present invention comprises a reverter adapted to revert the sheet so that both sides of the sheet can be processed while a leading edge of the sheet is maintained, a holonomic actuation system adapted to transport the sheet through the apparatus, and a sheet return pathway for transporting the sheet to the one-sided processing station.

In another aspect, the present invention is directed to a reversion module for an object handling system. In one embodiment, the present invention comprises a first channel adapted to receive the object having a first surface in a face up orientation, a curved channel section adapted to change an orientation of the object wherein the first surface is in a face down orientation and the second surface is in a face up orientation, and a second channel adapted to receive the object from the curved channel and output the object to the object handling system.

In a further aspect, the present invention is directed to a method for reverting an object in an object handling system. In one embodiment, the method comprises inputting the object into a reversion module, reverting the object in the module wherein a first surface of the object in a face-up orientation is reverted into a face-down orientation while maintaining a first edge of the object as a leading edge if the object, and outputting the reverted object to the object handling system.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
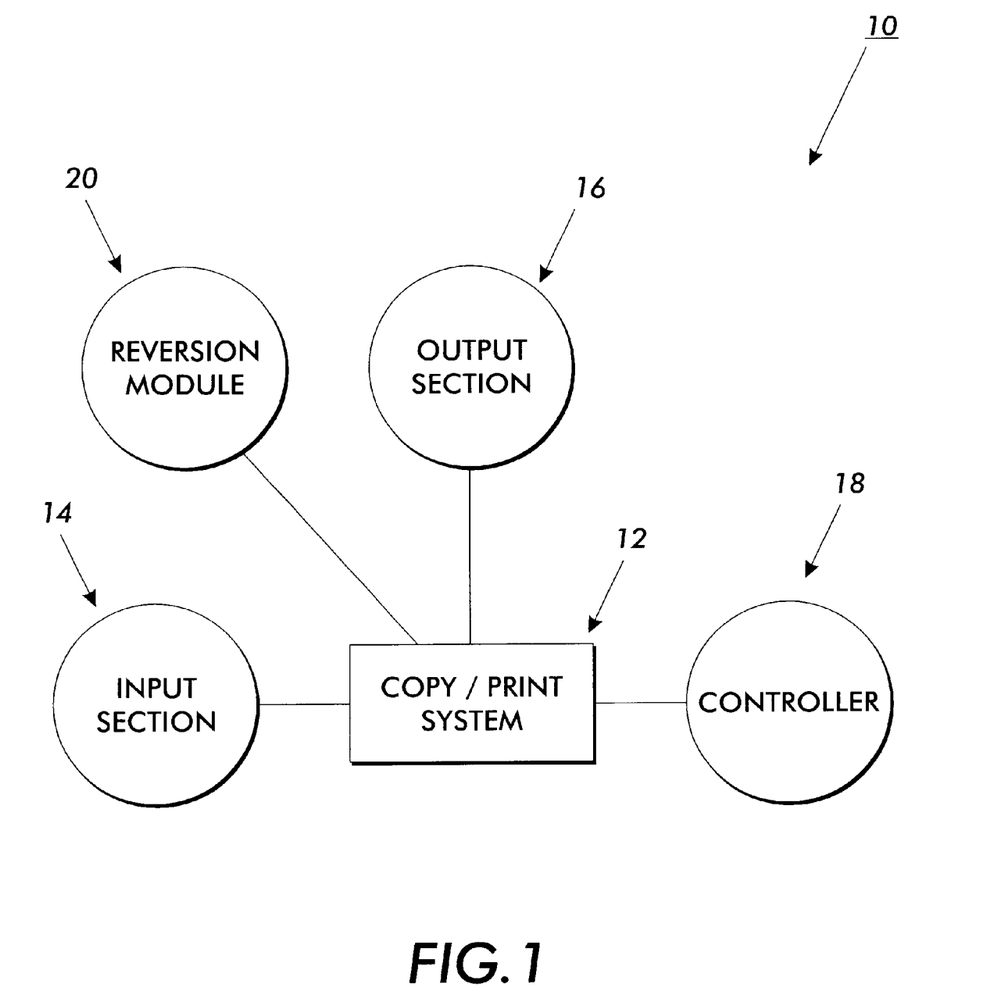
FIG. 1 is block diagram of one embodiment of a system incorporating features of the present invention.

Referring to FIG. 1, there is shown a block diagram of a system 10 incorporating features of the present invention. Although the present invention will be described with reference to the embodiments shown in the drawings, it should be understood that the present invention could be embodied in many alternate forms of embodiments. In addition, any suitable size, shape or type of elements or materials could be used.

Figure 10A:
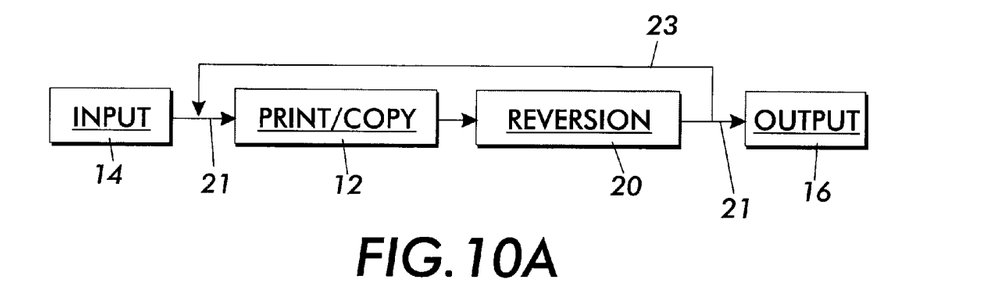
FIGS. 10A, 10B, and 10C are block diagrams of embodiments of systems incorporating features of the present invention.
Figure 10B:
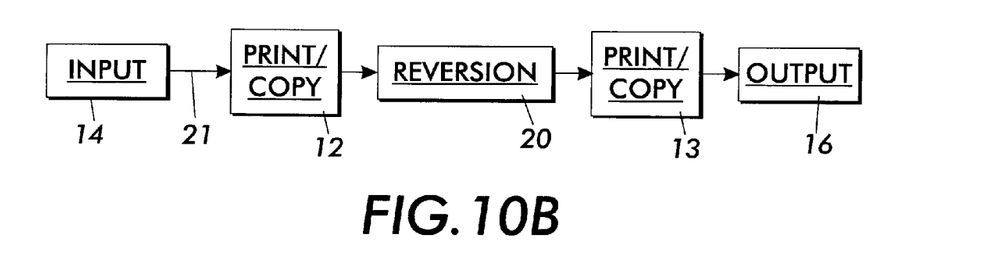
Figure 10C:
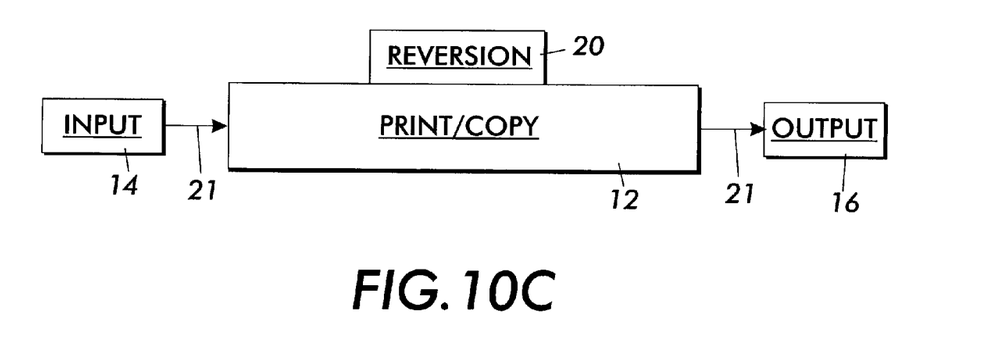

As shown in FIG. 1, the system 10 can generally comprise a printing or copying apparatus 12. The apparatus 12 can include an input section 14, an output section 16 and a controller 18. The input section 14 can comprise for example an image input terminal ("IIT") and the output section 16 can comprise for example an image output terminal ("IOT"). The apparatus 12 also includes a reversion module 20. Referring to FIGS. 10A, 10B and 10C, the reversion module 20 is generally a part of a paper path or object path within the system 10 that runs between the input section 14 and the output section 16. For example, in FIG. 10A, the reversion module 20 is located in the paper path 21 after the print/copy station 12, and the substrate (not shown) is returned along a paper path 23 in the reverted state to the path 21 and back to the print/copy station 12 for further processing. After processing is complete, the substrate is delivered to the output station 16. In FIG. 10B, the substrate travels along the path 21 through the print/copy station 12, through the reversion module 20 and through a second print/copy station 13 and to the output station 16. In FIG. 10C, the print/copy station 12 is distributed in space, such as a belt, so that portions of the printing/copy process, such as toner image (latent image) transfer can occur in spatially distinct regions, but the total printing such as fusing images occurs after both images have transferred. In one embodiment, the reversion module 20 can comprise a moebius reversion module. In an alternate embodiment, the apparatus 12 can comprise any conventional duplexing printing/copying apparatus, such as for example a duplexing electrophotographic apparatus or a xerographic apparatus and include conventional components. An example of an electrophotographic apparatus can be seen in U.S. Pat. No. 6,057,930, which is incorporated herein be reference.

The reversion module 20 is generally adapted to revert a substrate, such as for example a sheet of paper, for duplex copying, without changing the leading edge orientation of the paper, as is the case in an inversion process. It is a feature of the present invention to revert the paper as it passes through the module in order to process the reverted surface of the substrate. Although the use of the reversion module 20 is described herein in conjunction with a print/copy system 12, it should be recognized and understood that the present invention can be incorporated into any system that requires that a substrate be turned over.

The general printing process will be understood by those of skill in the art, and only the features related to the duplex copying process will be generally described herein. Although the present invention is described herein with reference to a printing system or machine, it should be understood that in alternative embodiments, the present invention can also be incorporated into any suitable duplicating or copying system.

The various machine functions can be regulated by a controller 18. The controller 18 is generally a programmable microprocessor that controls all of the machine functions herein described. The controller can, for example, provide a comparison count of the copy sheets, the number of documents being recirculated, the number of copy sheets selected by the operator, time delays, jam corrections, etc. The control of all of the exemplary systems herein described may be accomplished by conventional control switch inputs from the machine consoles selected by the operator. Conventional sheet path sensors or switches may be utilized to keep track of the position of the documents and the copy sheets. In addition, the controller 18 regulates the various positions of the gates depending upon the mode of operation selected.

The goal of the paper transport system in typical electrophotographic duplicating systems is to take a sheet of paper and move it from one point in the paper path to another while performing one or more operations (i.e. reversion, imaging, transfer, fusing, etc.) in between. In the reversion module 150 incorporating features of the present invention, a flexible medium or media, such, such as for example paper sheets, are preferably transported by means of omnidirectional fluid flow. The term "sheet" is generally used herein to describe the flexible medium. Generally, a flexible medium or sheet can include any flexible object that can be adapted to be transported by a transport system, such as for example, a substrate or a sheet of paper.

Examples of such transport systems can include for example, airjet transport modules, spherical nips ("SNips") spin-roller drives, omni-directional drive systems or spherical paper moving devices. An example of a spherical paper moving device is described in U.S. Pat. No. 6,059,284, commonly assigned to the same assignee as the present invention, the disclosure of which is incorporated by reference in its entirety. The airjet transport, spherical nips, omni-direction drive, or two-way NIPs are all examples of holonomic transport mechanisms. These embodiments can move the part in any direction, including velocity direction, at any time, not just the axes perpendicular to the roller axis as in traditional transport systems.

Figure 6A:
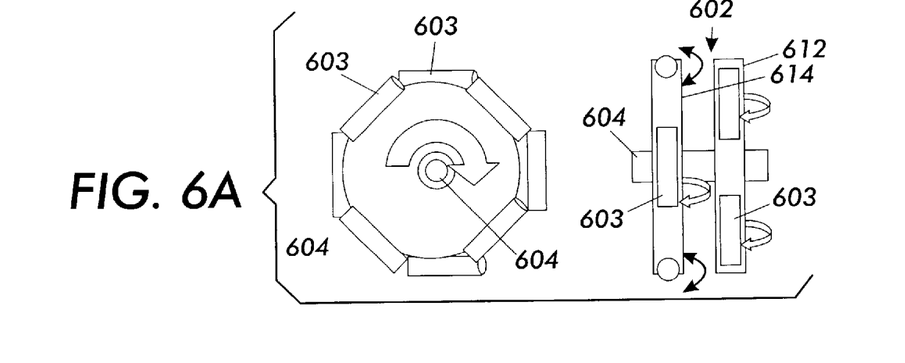
FIGS. 6A, 6B and 6C are perspective views of exemplary roller transport systems that can be used in the present invention.
Figure 6B:
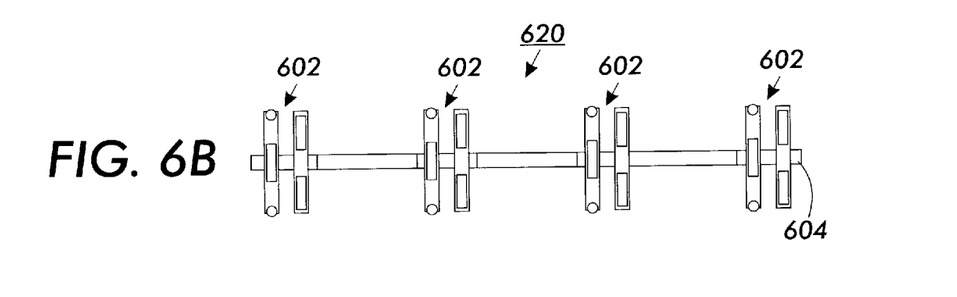
Figure 6C:
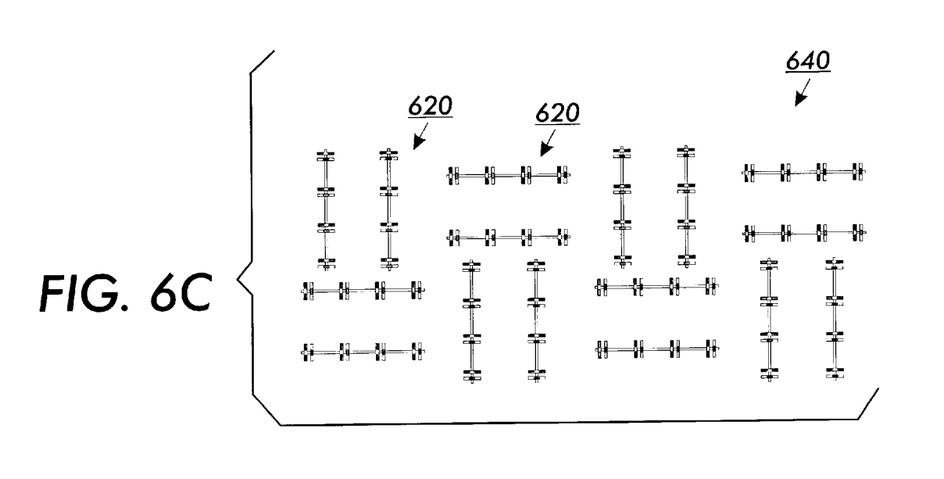

Examples of a two-way roller system that can be used in the reversion module incorporating features of the present invention are shown in FIGS. 6A, 6B and 6C. A two-way roller permits motion in directions at non-perpendicular angles to the roller axle 604 as depicted in FIGS. 6A–C. In FIG. 6A, a single, two-way nip 602 is presented. The nip 602 consists of a set of two discs 612 and 614. A set of four perimeter rollers 603 are mounted on or along the perimeter of each disc 612 and 614. These perimeter rollers 603 are generally constructed so that they are tapered towards the outside so that the outmost profile of the roller 603 is a circle when viewed along the axis. A second disc 614 or nip has the same structure but the perimeter rollers 603 are rotated, or positioned, at intervals approximately 45 degrees with respect to the rollers 603 on the first disc 612. The two discs 612, 614 and the relative rotation are needed in order that a perimeter roller 603 is always in contact with the object to be moved. These discs 612, 614 share a common axle 604 to form the two-way nip 602.

Referring to FIG. 6B, a series of two-way nips 602 can share a common axle 604 to form a two-way roller 620. If this two-way roller 620 is in contact with an object, the object can be moved by some external force at an angle that is not perpendicular to the roller axle 604. The perimeter rollers 603 rotate permitting this non-perpendicular motion unlike a roller constructed of solid nips without the perimeter rollers 603. However, the two-way roller 620 is capable of exerting a force in the direction perpendicular to the roller axle 604 just like a normal roller because the perimeter rollers 603 can exert a force along their axis of rotation. Thus, in FIG. 6B the two-way roller 620 can move an object in a direction perpendicular to axle 604, but permit motion of the object in a different direction.

FIG. 6C is an example of a two-roller array 640 capable of omni-directional object driving. In FIG. 6C, a number of two-way rollers 620 are grouped into perpendicular arrays so that a force in any arbitrary direction within the plane can be exerted on the object by appropriate torque applied to the rollers in the two orthogonal directions. The object is free to move in that direction in response to the force because of the two-way roller action described above. The arrays 640 are examples of holonomic actuators that can be used with the present invention in that they can provide motion in any direction at any time. As arrays 640 are driven by motors, the flexible sheet can be made to move at any angle with respect to the forward direction at any time. If these arrays 640 are incorporated into either a Mobius strip return path, a spiral path or a side loop, the flexible sheet will be reverted rather than inverted. In the case of the former two cases, the sheet will not require acceleration or deceleration and maintain its forward velocity. The rollers are used to move the flat, flexible sheet in opposable arrangement (i.e. one on top and an opposing one, usually an idler, underneath in order to trap the roller.) It will be recognized that roller array 640 is just one example of an omni-directional transport system, and any suitable omni-directional transport system could be implemented.

An airjet transport system is generally a paper transport system that uses flowing air instead of rollers to apply the motive force to the paper sheets to move the flexible sheet. A system controller in the electrophotographic duplicating system interacts with the individual or local module controllers for the various airjets. An example of a control architecture for sheet handling is described in U.S. Pat. No. 5,999,758, commonly assigned to the same assignee as the present invention, the disclosure of which is incorporated by reference in its entirety.

In accordance with the present invention, when the term "inversion" is used herein with regard to a flexible sheet, it is generally meant to mean that the sheet is turned over, i.e. the top surface of the sheet is made the bottom surface and vice versa. In a typical inverter where a sheet of paper is subject to inversion, the leading edge of the sheet of paper prior to inversion is no longer the leading paper edge after inversion, i.e. the two opposite edges of the sheet of paper are reversed. However, unlike the inversion process of the prior art, in a reversion process incorporating features of the present invention, the leading edge of the sheet of paper prior to reversion remains the leading edge after reversion. The two opposite edges of the sheet of paper are not reversed by the reversion process. In reversion, a significance of the leading edge of the paper staying the same after the reversion process is that it permits the paper handling system to register images with respect to the leading edge rather than the trailing edge as with the inversion process.

Figure 5:
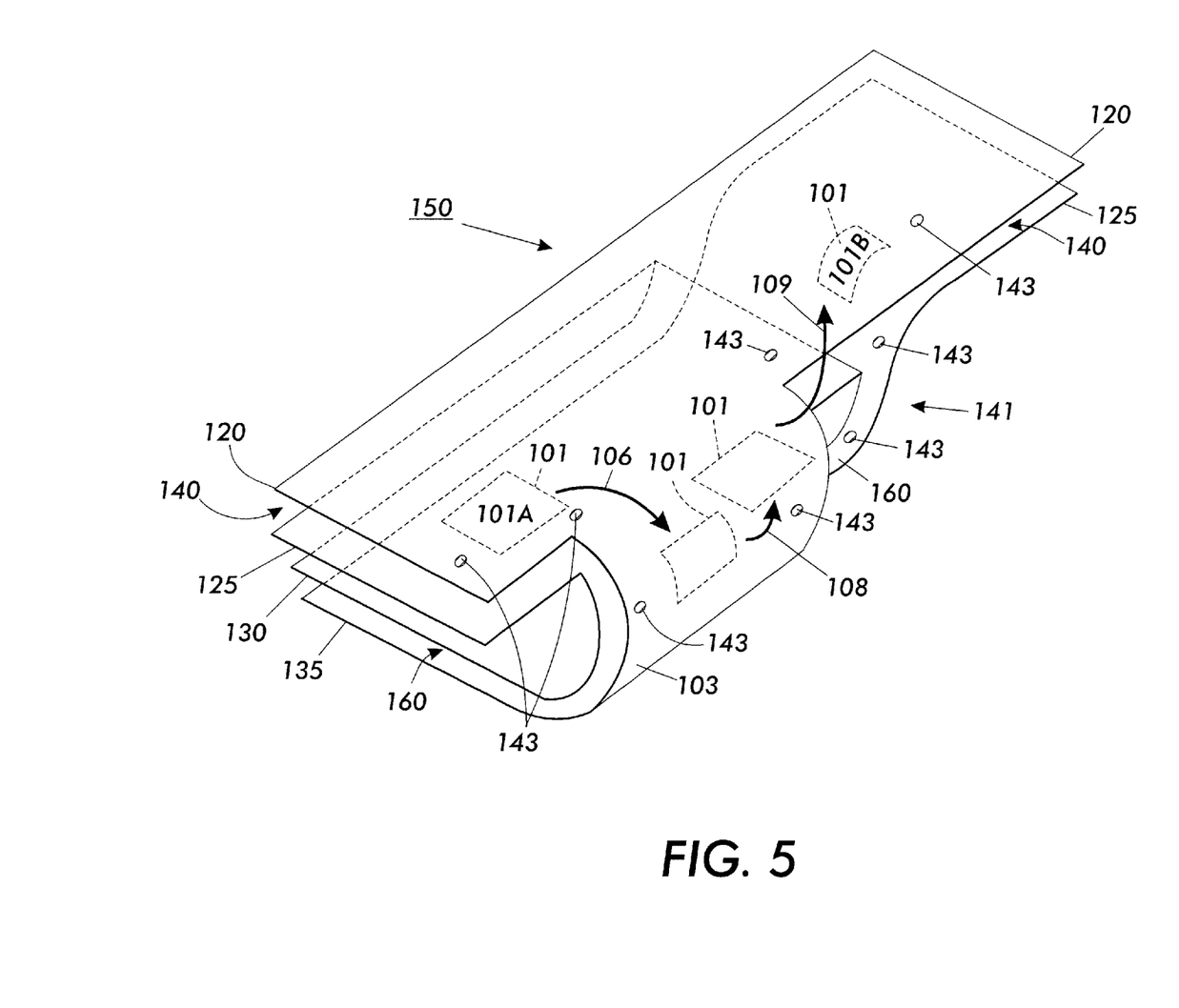
FIG. 5 is a perspective view of one embodiment of a reversion module incorporating features of the present invention.

Referring to FIG. 5, an embodiment of a reversion module 150 incorporating features of the present invention is shown. Generally, the reversion module 150 comprises an upper channel 140, a curved section 103 and a lower channel 160. The upper channel 140 is generally formed between two channel walls or layers, 120 and 125. The channel walls can generally comprise the fluid transport system. The layers 120 and 125 can include airjets to move a flexible sheet 101 along the channel 140. The curved section 103 is approximately a 180° curve from the channel 140 to the channel 160. The channel 160 is generally formed between two channel walls or layers, 130 and 135. The layers 130 and 135 are similar to the layers 120 and 125. Generally, a flexible sheet 101, which in this example is shown as a sheet of paper, is caused to enter the upper channel 140, move through the curved section 103 into the lower channel 160 and exit the reversion module. In one embodiment, the lower channel 160 can be adapted to merge with the upper channel 140, so that the sheet 101 exits the reversion module through the upper channel 140. It is a feature of the present invention to cause a sheet 101 to "revert" as it passes through the reversion module 140 in order to be able to place or form an image for printing or copying on the reverted side or surface of the sheet 101.

As shown in FIG. 5, the reversion module 150 can be adapted to allow a sheet 101 to enter the upper channel 140 of the reversion module 150. Generally, then sheet 101 enters the module 150 with an image formed on the side 101A of the sheet 101. The sheet 101 can be driven by any suitable fluid transport system along the channel 140, such as for example, an airjet conveyor system 300 comprising airjets 100 in the channel layers or walls 120 and 125. Although the fluid transport layers 120, 125, 130 and 135 are described herein as preferably comprising an air jet transport system, it should be understood that in alternate embodiments, any suitable transport mechanism, fluid transport mechanism or holonomic actuation means can be used to move a sheet 101 through the reversion module.

Upon entering the reversion module 150, the sheet 101 is shown with side 101A in a "face-up" orientation. The leading edge 101C of sheet 101 as it enters the module is shown moving in the process direction. Sheet 101 moves in the direction of arrow 106 and arrow 108 as the sheet is reverted. After reversion, the sheet 101 enters the channel 160. In the reverted position, the side 101B of sheet 101 is now in the "face-up" orientation. The edge 101C of sheet 101 remains orientated to the process direction as the leading edge of sheet 101. Sheet 101 can then be moved out of the module for further processing, such as for example, placing an image on the surface 101B of sheet 101 to complete a duplexing operation.

Figure 2:
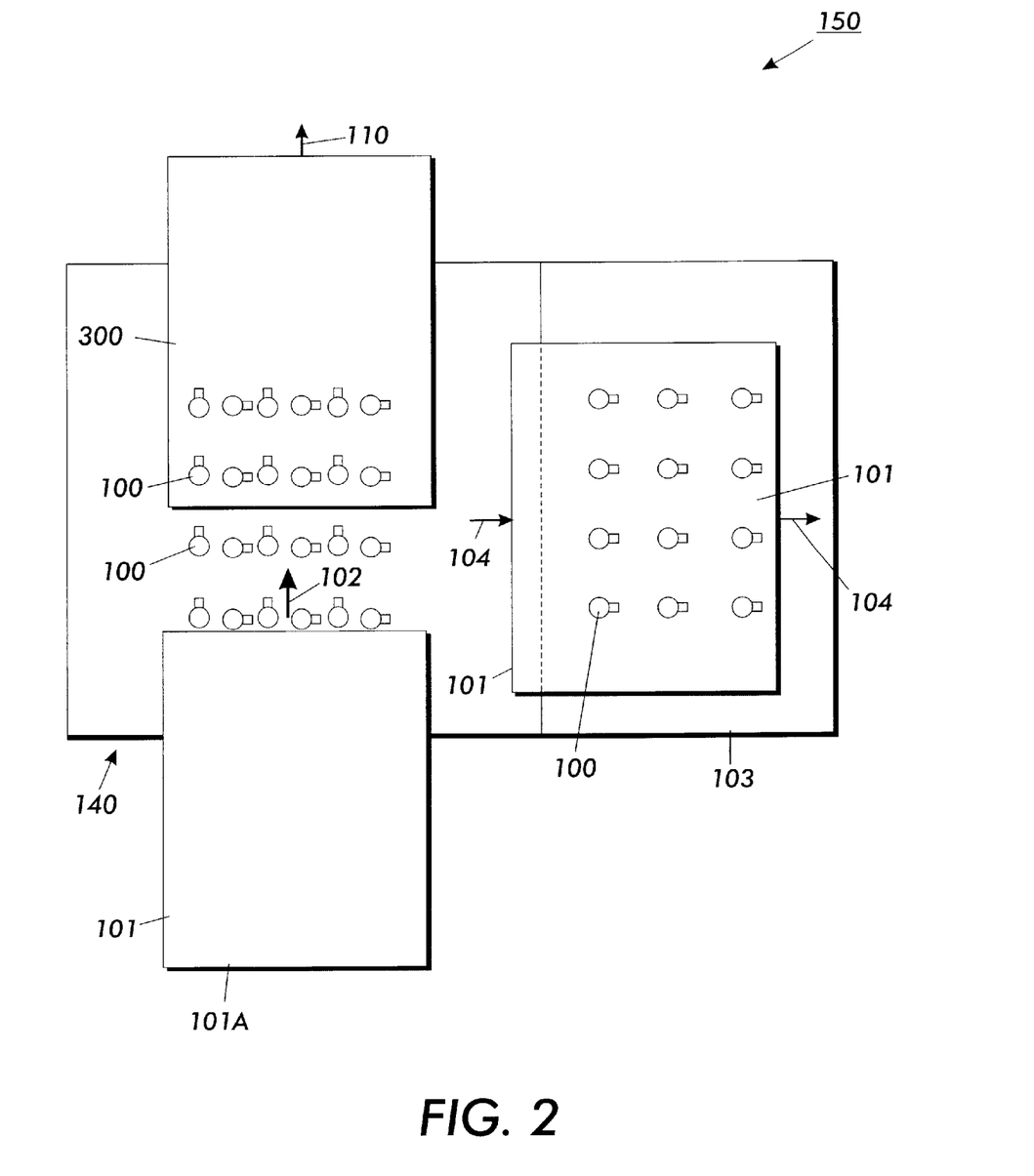
FIG. 2 is a top plan view illustrating the movement of a substrate in an embodiment of a reversion module incorporating features of the present invention.

Referring to FIGS. 2 and 5, in one embodiment, the flexible sheet 101 enters into the reversion module 150 through the upper channel 140. Once the sheet 101 is fully within the module 150, the sheet 101 is decelerated to zero velocity, and then transported laterally in the direction of arrow 104 through the 180° curved section 103 of the module and into the lower channel 160. Once the sheet is fully in this lower section 160, the movement of the sheet 101 can again be stopped and motion along the path in the direction of arrow 110 resumes. The "reverted" substrate 101 can then be processed or transported for example, to the transfer station D for duplexing.

Figure 3:
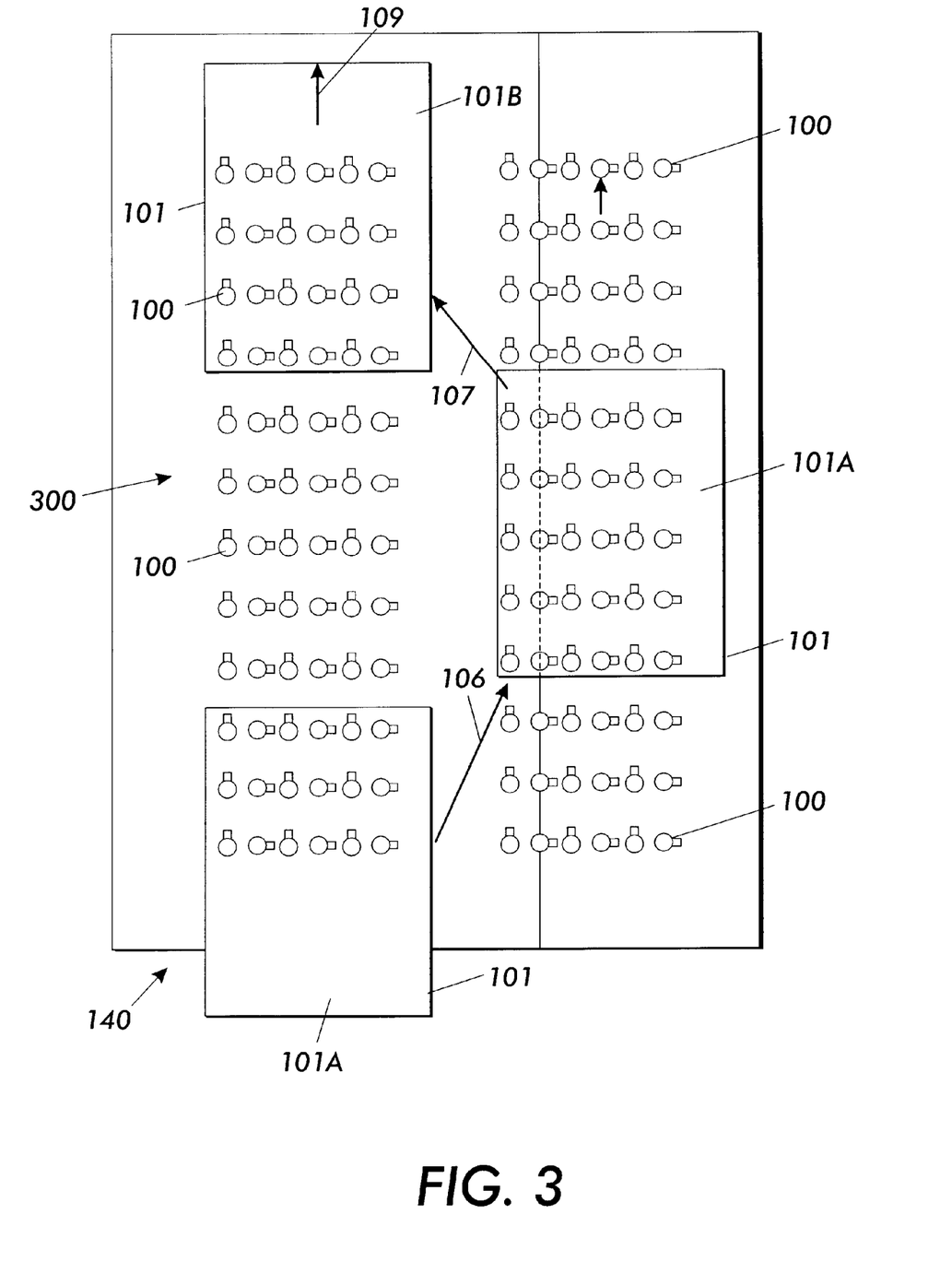
FIG. 3 is a top plan view illustrating the movement of a substrate in an embodiment of a reversion module incorporating features of the present invention.

Referring to FIGS. 3 and 5, in another embodiment of the present invention, each flexible sheet 101 enters the upper portion or channel 140 of the reversion module 150 with side 101A in a "face-up" orientation. The sheet 101 can be brought to this position in a similar fashion as described for the embodiment shown in FIG. 2. The sheet 101 is moved continuously in the direction of arrow 106 to the curved section 103 of the reversion module 150. In the curved section 103, the sheet 101 can move for example in a spiraling motion and is reverted so that surface 101B is now face-up. The sheet 101 then moves in the direction of arrow 107 where the reverted sheet 101 exits from the reversion module 150 in the direction of arrow 109. In the embodiment shown in FIG. 3, the sheet 101 does not require deceleration prior to reversion. Instead the flexible sheet are continuously processed through the reversion module 150 without slowing or stopping.

Figure 4A:
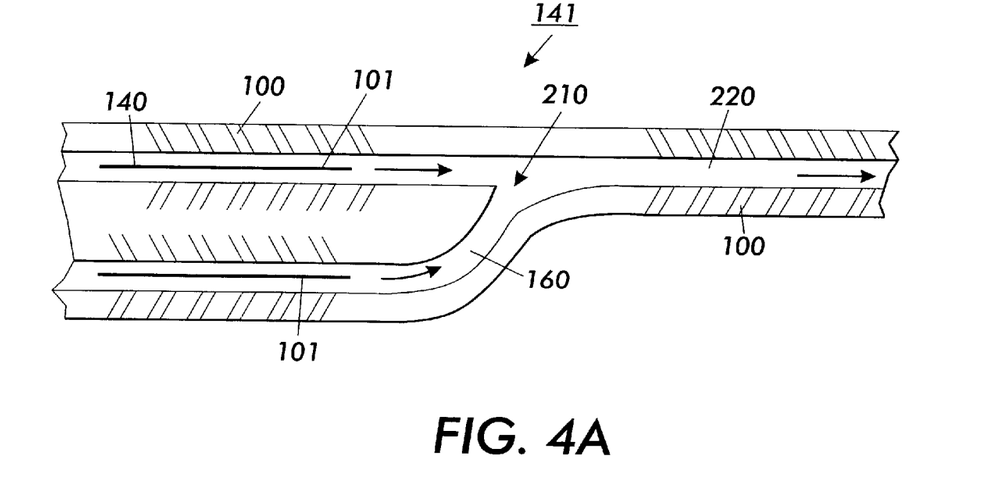
FIGS. 4A and 4B are cross-sectional views of the reversion module illustrated in FIG. 5 depicting different embodiments of the substrate movement paths in the module.
Figure 4B:
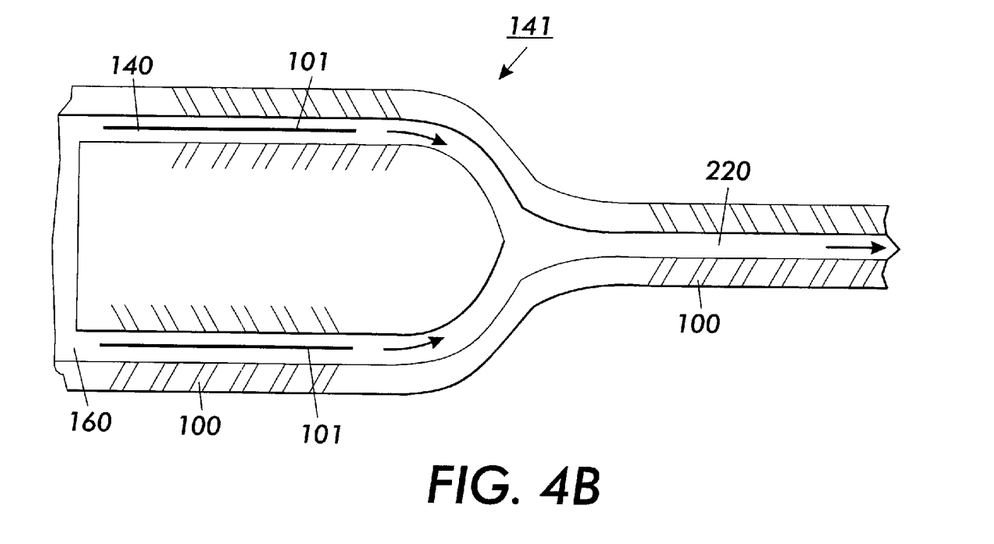

Referring to FIGS. 4A and 4B, a cross-sectional view of the exit portion 141 of the reversion module of FIG. 5 is shown. For illustration purposes both FIGS. 4A and 4B show a sheet 101 moving in the upper channel 140 as well as the lower channel 160. For example, in one embodiment, the sheet 101 can travel in a continuous path through the reversion module without reversion.

In a reversion process, if the same level or path plane is required for the reverted sheet 101 as it exits the module 150 as it entered, a section 210 of the module 150 shown in FIG. 4A can connect the upper channel 140 and the lower channel 160. In an alternate embodiment, the sheet 101 can exit the reversion module 150 on any suitable plane or level compared to the plane or level from which it entered as shown in FIG. 4B.

The particular embodiment of the invention shown in FIG. 2 generally requires a deceleration of the sheet 101 in the process direction and therefore large changes in the inter-sheet spacing in the paper path preceding the reversion module 150. In the embodiment referring to FIGS. 3 and 5, sheet 101 can be reverted while maintaining the velocity of the sheet 101 in the process direction without any deceleration. In this embodiment, the need for changes in the paper path velocity and a large intersheet gap can be reduced or eliminated.

In the embodiment of the present invention using an airjet system as the fluid transport system, the airjet system 100 can be created by a ventilator (not shown) or by an air injector (not shown) and the sheets handled in the manner as described in U.S. Pat. No. 5,634,636, commonly assigned to the same assignee as the present invention, the disclosure of which is incorporated by reference in its entirety. Referring to FIGS. 2 and 3, the airjets 100 can generally be formed or directed in various orientations, such as lateral orientation for pushing the substrate 101 sideways or a forward orientation for pushing the sheet 101 in the process directions. The airjet conveyor used with the present invention generally permits ready detection and correction of trajectory, rotation, slight misalignments, three dimensional misalignments due to flutter, creases, edge turning, or other orientation problems that can be difficult to quickly detect and provide suitable movement compensation using standard material processing movement control systems. As will be appreciated by those skilled in the art, proper air jet construction and control is a function of the present invention. Typically, air jets must be constructed and positioned with respect to a flexible object to enable application of on the order of one millinewton of force to each side of the flexible object, with precise force values of the course depending on material and dynamic properties of the flexible object, along with the desired object acceleration and trajectory. For best operation, the exerted air jet forces must be quickly changeable. For example, a typical 0.025 centimeter (0.0635 inches) diameter orifice having a length of about 0.1 centimeter (0.254 inches) would be expected to have an intrinsic response time for air movement on the order of 100 microseconds. Of course valve response times, controllers, motion analysis, and pressure conditions must also be such that air jet operation and control occurs on a millisecond time scale. One example of a paper handling flap valve array system is described is U.S. Pat. No. 6,004,395, commonly assigned to the assignee of the present application and which is incorporated herein by reference in its entirety.

As will be appreciated by those skilled in the art, many suitable valve designs are capable of being used in conjunction with the present invention. For example, piezoelectric, thermal bimorph, thermal volume change, fluid state change, acoustic pressure, or electrostatic microactuator valves can all be used. Air flow through valves can be individually controlled or controlled in groups. For best results, fast acting (millisecond or less) valve operation times are preferred, however with appropriate predictive movement controllers, slower operating valves can be used.

Construction of valves for use in conjunction with the air jet architecture used with the present invention or the architecture of other suitable air jets in accordance with the present invention, is possible with a variety of machining or micromachining techniques, including those associated with conventional integrated circuit fabrication. For example, chemical etching, electron beam lithography, photolithography, or other standard integrated circuit batch processing technologies can be used to define necessary air conduits, control or circuitry conduits, holes, orifices, and apertures, and even movable valves. Alternatively, injection molding, high precision numerically controlled machines, or stereolithography can be employed for valve construction. Materials used in construction may include plastics, metals, or ceramics. In one embodiment, a semiconductor such as silicon may be coated with single or multiple layers of doped silicon, polysilicon, silicon nitride, silicon, silicon oxide, oxynitride, plastics or aluminum, or any other available material suitable for lithographic processing to define the necessary valve structures or conduits.

Referring to FIG. 5, control of the flexible object path through channels 140 and 160 can be enabled by provision of a plurality of integrated sensors 143 positioned at desired points along the substrate path through channels 140 and 160. These sensors 143 can include, but are not limited to, optical, mechanical, thermal, electrostatic, or acoustic sensors. The sensors 143 are used to provide near continuous sensor feedback relating to object position, which in turn allows nearly continuous movement control of flexible objects 101 passing adjacent to the air jets or transport mechanism. As will be appreciated, information received from the sensors 143 can be passed to a centralized motion analysis unit and motion control unit (not shown). Alternatively, distributed or local motion analysis and control can be employed. For example the sensors 143 can be integrated with computer microcircuitry capable of analyzing sensor input and directing control of the transport system.

The present invention allows for manipulation and control of a wide variety of flexible objects and processes. In addition to paper handling, other flexible sheet or articles of manufacture, including extruded plastics, metallic foils, fabrics, or even optical fibers can be moved in accurate three-dimensional alignment. As will be appreciated, modification in the layout of the reversion module 150 shown in FIG. 5, which may also be described as a sheet conveyor, are contemplated, including but not limited to use of curved conveyors with curvature either in a process direction or perpendicular to the process direction to allow for vertical or horizontal "switchbacks" or turns, use of cylindrical or other non-linear conveyors, or even use of segmented conveyors separated by regions that do not support air jets. In addition, it may be possible to construct the conveyor from flexible materials, from modular components, or as interlocking segmented portions to allow for quick and convenient layout of the conveyor in a desired materials processing path.

Referring to FIGS. 2 and 3, some of the possible control, transport, and orientation modes for directed application of force to a flexible object 101 via air flow from directed air jets 100 is shown. Applied transporting forces are directed against the flexible object 101 to longitudinally transport the flexible object in a specific direction. As will be appreciated, the longitudinal force gradient also results in longitudinal tensioning forces on flexible objects 101. In addition, lateral tensioning forces substantially perpendicular to the transporting forces are maintained on edges of the flexible objects. These combined longitudinal and lateral tensioning forces result in flattening of the flexible objects 101. Of course, as those skilled in the art will appreciate, the strength and direction of the directed forces can be greatly modified, allowing, for example, directed tensile or compressive forces to curve objects 101 about a longitudinal axis, a lateral axis, or even curving of selected subregions of an object (e.g. the corner of the object). This level of control would, for example, permit impressing curvature on a paper sheet about a longitudinal axis (parallel to the process direction) in order to enhance the paper stiffness. The current invention allows for reverting a flexible sheet without changing or switching the leading edge of the sheet rather than inverting the sheet as is done in a duplex printing and copying environment. In a reversion process of the present invention, the leading edge 101C of the sheet 101 remains the same. This permits for example, a paper handling system to register images with respect to the leading edge 101C rather than the trailing edge, as is the case with inversion. The design of the rest of the paper path becomes much simpler if one only has to align everything with respect to the leading edge. For example, the number of paper edge sensors is roughly halved as well as the number of rollers reduced.

In a copying or printing system, the present invention allows for reversion at the processing speed even with closely spaced sheets of paper. In order to efficiently use a paper path for example, the sheets should be as close together as possible. With most current inversion methods, the sheet must come to a stop and then its motion reversed. This requires that the sheets be at least one sheet size apart. Therefore the sheets must run at twice the paper path speed in order to separate the sheets for the inversion process. One of the features of an embodiment of the present invention is that the paper can be reverted without decelerating the paper.

The deceleration process causes the greatest stress on the paper path components, so its elimination greatly improves reliability. In the current invention, the sheets can be reverted at the process speed of the machine and they can be spaced at a fraction of the sheet size spacing. This further reduces the cost of duplex printing paper path and allows more sheets to be processed within a set time period.

It is also a preferred feature of the present invention to avoid using rollers in a copier duplication type of machine for reversion and instead employ fluid flow, such as air flow for supporting and moving paper sheets especially for the "reversion" process. One of several advantages to this is that cylindrical rollers only tend to move things in a forward direction. Air flow allows the paper to move in any direction including sideways.

Figure 7:
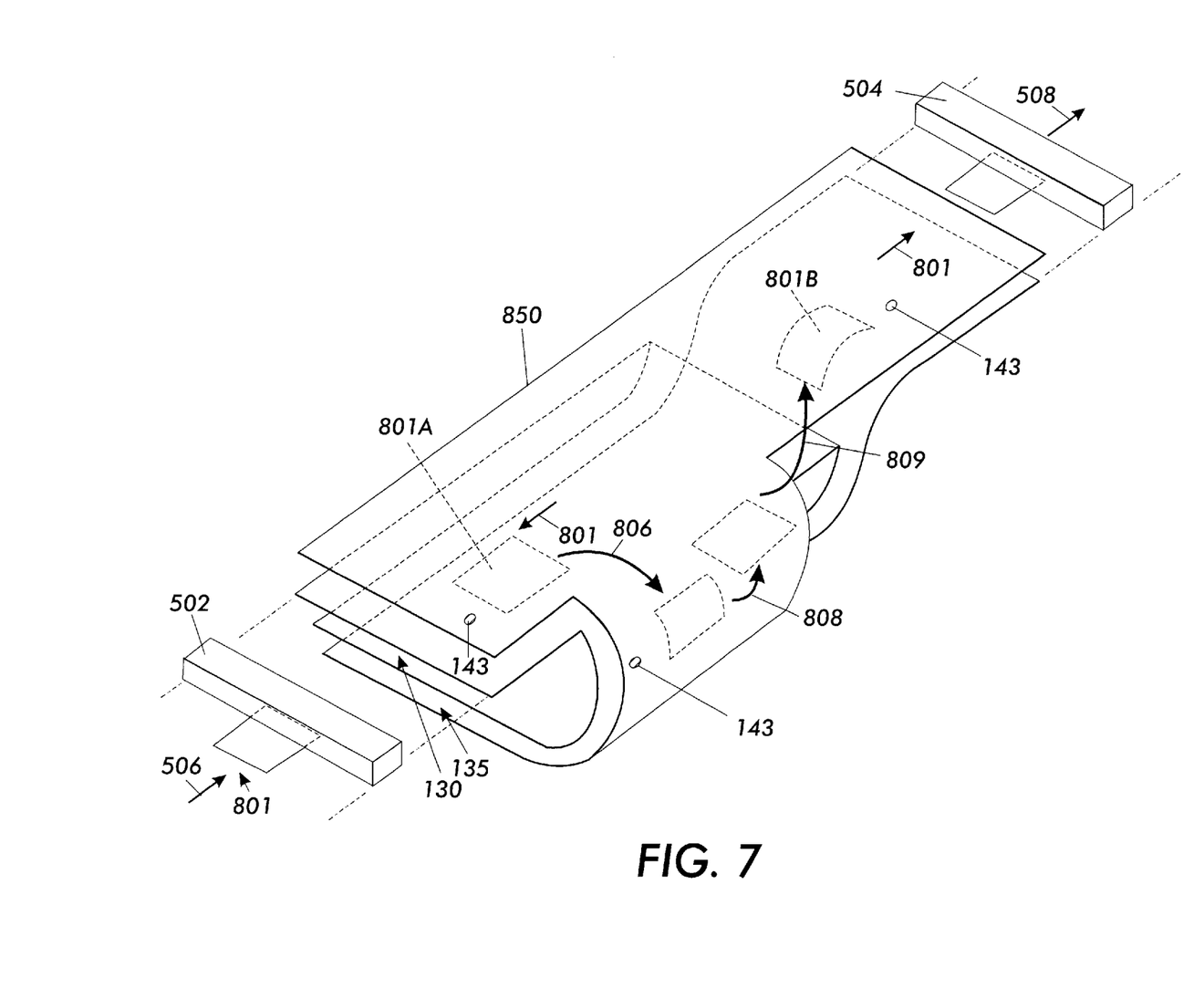
FIG. 7 is a perspective view of an embodiment of a reversion module incorporating features of the present invention.

Referring to FIG. 7, in one embodiment, one print station 502 can be positioned near the input 506 to the reversion module 850 and another print station 504 can be positioned near the output or exit 508. The substrate 801 can be processed on one side 801A or surface as it travels through the print station 502, be reverted as travels through the reversion module 850 and be processed on the other side 801B as it is outputted from the reversion module and passes through the print station 504.

Figure 8:
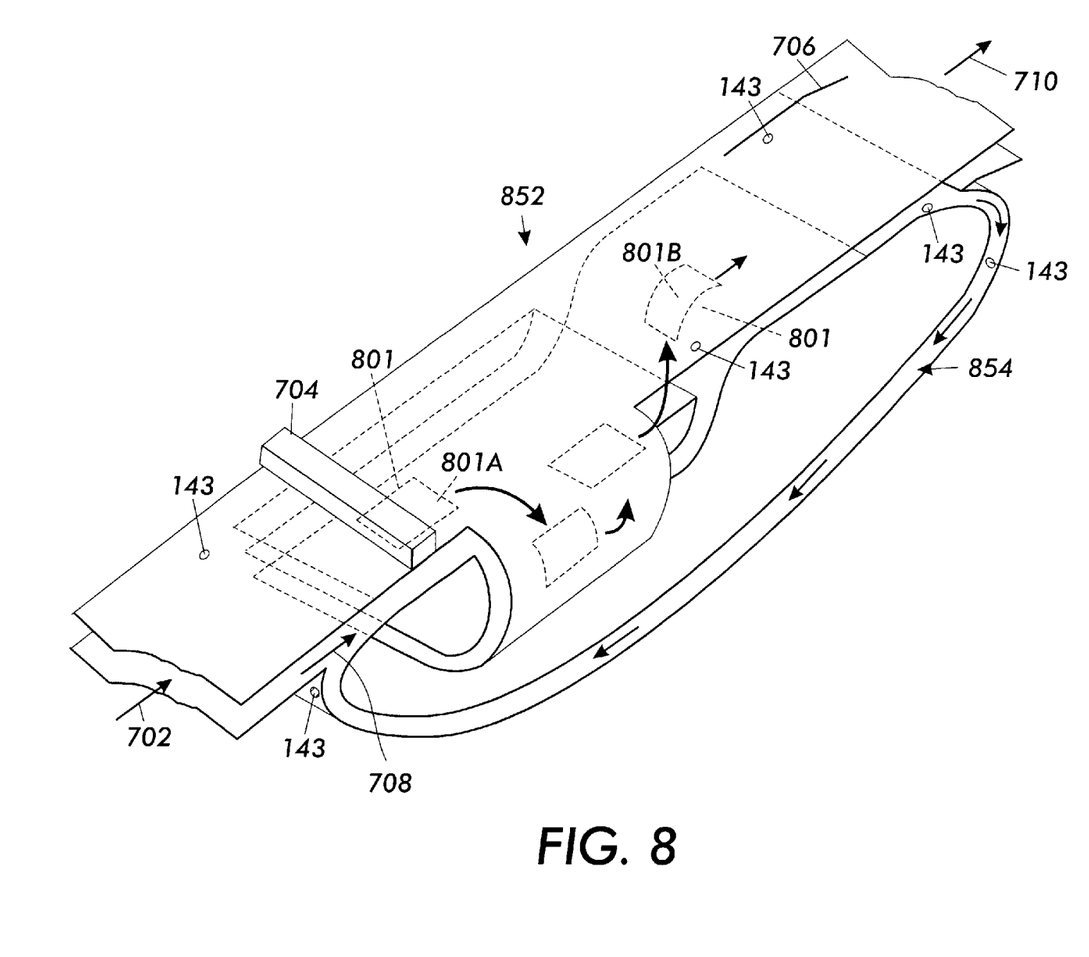
FIG. 8 is a perspective view of an embodiment of a reversion module incorporating features of the present invention.

In one embodiment of the present invention as shown in FIG. 8, a single print station 704 can be used. As the sheet 801 moves through a reversion module 852 similar in structure and design to the reversion module 850 shown in FIG. 7, it is transferred back to the print station 704. Generally, this type of system requires a means, such as channel 854 to recirculate the sheet 801 back to the print station 704. This system also requires a splitter 706 to separate sheets that need to be recirculated for duplex imaging from those that need to exit out of the reversion module through output section 710 because both sides, 801A and 801B, of the sheet 801 have been imaged. This system also includes a merge point 708, which may also include a splitter, to allow the recirculating sheets to merge back into the same path that a new sheet entering the module 852 from input section 702 would take in the direction of the print station or head 704.

Figure 9:
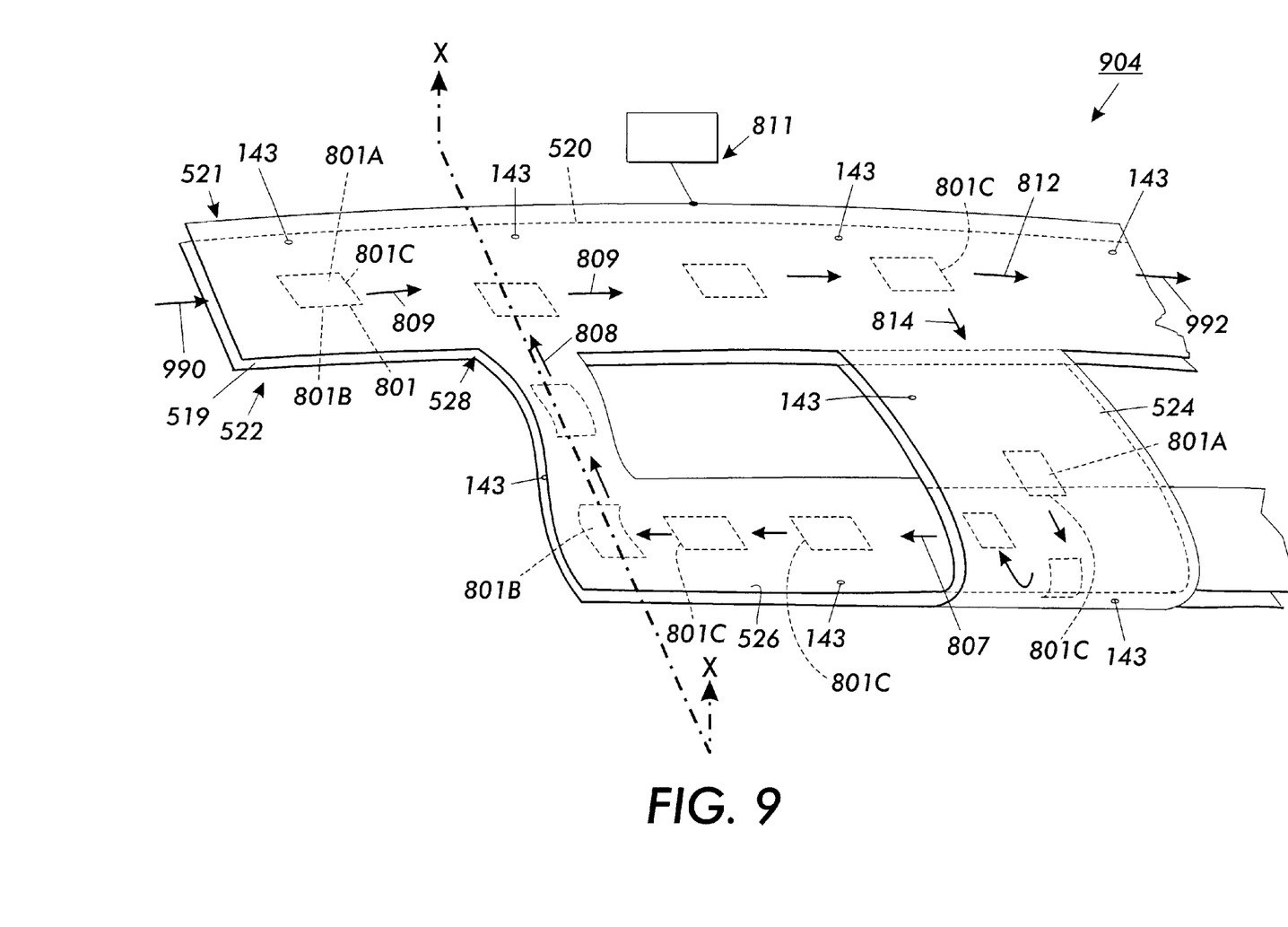
FIG. 9 is a perspective view of an embodiment of a reversion module incorporating features of the present invention.

Referring to FIG. 9, in one embodiment, the present invention can comprise a moebius reversion module 904. Generally, the reversion module 904 is adapted to revert the paper and return the reverted paper along the reversion path using moebius topology for printing on the unimaged side of the sheet. Generally, only a single return path and a single print station are needed with the embodiment of the present invention including reversion module 904. The reversion module 904 shown in FIG. 9 generally comprises a single baffle reversion module having an omni-directional drive section 520. The drive section 520 generally comprises a channel 519 or baffle having an upper surface 521 and a bottom surface 522. The substrate 801 travels in the channel 519 of the drive section 520 between the upper surface 521 and the bottom surface 522 of the channel 519. The omni-directional drive section, or preferably a fluid transport system, is generally adapted to allow movement of the sheet in any desired direction, including forward or backward movement along the paper path as well as lateral movement. This allows the reversion and movement of the substrate 801 back to the original print station 811 in a moebius geometry, or a loop with a single twist. The sheet 801 must be decelerated along the line of the paper path in order to reverse course and return to the print station 811. This embodiment provides for reversion and the use of a single print station without any mechanics for splitting or joining paper paths other than the use of fluid drivers.

As shown in FIG. 9, a substrate 801, such as for example, a sheet of paper, enters the channel 519 of the reversion module 904 through input section 990 in the direction of arrow 809. The substrate 801 has a surface 801A in a face-up orientation, a surface 801B in a face-down orientation and an edge 801C in the process direction. The edge 801C is the leading edge of the substrate 801. The substrate 801 travels in the direction of arrow 809 towards a print station 811 where a first image is placed on the surface 801A. The sheet 801 can then be processed out of the reversion module 904 in the direction of arrow 812 through exit or output section 992 for simplex imaging, or if duplex imaging is complete, or processed in the direction of arrow 814 if duplex imaging is desired. By traveling in the direction of arrow 814, the sheet 801 is subject to a reversion process. During the reversion process, surface 801B becomes the face-up surface and the surface 801A becomes the face-down surface. The edge 801C of the sheet 801 continues to be the leading edge of the sheet 801 in the process direction.

Figure 11:
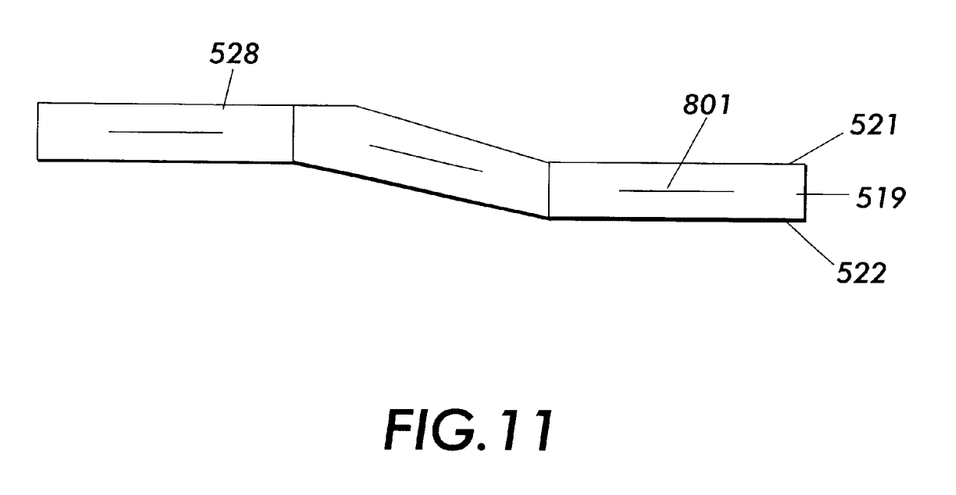
FIG. 11 is a cross-sectional view of FIG. 9 taken along the line X—X.

After reversion, the sheet 801 travels in the direction or arrows 807 and 808 back towards the top of the baffle. When the sheet 801 reaches the top of the baffle, the sheet 801 travels in the direction of arrow 809 towards the print station 811 where an image can be placed on surface 801B to complete the duplex imaging process. The duplexed sheet 801 can then be processed out of the reversion module 904 in the direction of arrow 812. As shown in FIG. 9, the reversion path 524 also acts as the return path to the print station 811. It is a feature of this embodiment of the present invention to save hardware by eliminating the need for a separate return path, such as that shown in FIG. 8, and eliminate the need for a second print station, such as the example shown in FIG. 7. In FIG. 7, the paper path for a copier using the reversion module 850 has a continuing straight path out of the module towards the second print or imaging station 504. As shown in FIG. 9, the reversion path 524 also acts as the return path. Splitting is accomplished by a sideways or lateral movement of the sheet 801 that moves the sheet into the reversion path 524. Merging is accomplished by having the sheet 801 approach the merge point 528 from a different direction. A cross-sectional view of the merge point 528 shown in FIG. 9 is illustrated in FIG. 11. Thus, using the moebius topology saves hardware by eliminating the need for the second print station or return path and allows the reversion and movement of the substrate 801 back to the original print station 811 in a moebius geometry, or a loop with only one surface. The sheet 801 is decelerated along the line of the paper path in order to reverse course and return to the print station 811. The paper is always moving in one direction and the same edge is always the leading edge. This embodiment of the present invention provides for reversion and the use of a single print station without any mechanics for splitting or joining paper paths other than the use of fluid drivers.

Some of the specific advantages offered in a duplexing system incorporating features of the present invention over prior duplexing systems which employ roller-type mechanisms to invert paper are summarized as follows:

1. Paper is reverted rather than inverted, eliminating the costs and complexity of trailing edge registration.

2. Elimination of the costs, complexity, and jams associated with the paper inventor.

3. Elimination of the need for employing twice the process speed before the inverter.

4. Elimination of roller acceleration and deceleration as well as solenoid actuated nips.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A flexible handling apparatus comprising:
    an input section for receiving the flexible sheet;
    a revision section for rotating the flexible sheet about an axis of motion; wherein the reversion section comprising:
        an upper channel adapted to receive the flexible sheet having a first surface in a face up orientation;
        a curved channel section adapted to change an orientation of the flexible sheet, wherein the first surface reverts from the face up orientation to a face down orientation; and
        a lower channel adapted to receive the flexible sheet from the curved channel and move the flexible sheet into an exit channel; and
    an output section for transferring the rotated flexible sheet to a sheet processing system.

2. The apparatus of claim 1 further comprising a fluid transport system for moving the flexible sheet through the apparatus.

3. The apparatus of claim 1 further comprising a roller based transport system for moving the flexible sheet through the apparatus.

4. The apparatus of claim 2 wherein the fluid transport system comprises an omni-directional drive mechanism.

5. The apparatus of claim 2 wherein the fluid transport mechanism is an airjet system.

6. The apparatus of claim 5 wherein the roller transport system is a spherical nip system.

7. The flexible sheet handling apparatus for reverting sheets in a system having at least one, one-sided processing station:
    a reverter adapted to revert the sheet so that both sides of the sheet can be processed while a leading edge of the sheet is maintained;
    a holonomic actuation system adapted to transport the sheet through the apparatus; and
    a sheet return pathway for transporting the sheet to the one-sided processing station wherein the sheet return pathway is a continued straight path out of the apparatus.

8. The apparatus of claim 7 wherein the sheet return path is a reversion pathway for reverting the substrate and returning the reverted substrate to the input pathway for processing in the one-side processing station.

9. A The apparatus of claim 7 wherein the holonomic actuation system comprises an omni-directional drive mechanism.

10. The apparatus of claim 7 wherein the holonomic actuation system is adapted to decelerate the sheet prior to reversion.

11. The apparatus of claim 7 wherein the holonomic actuation system is adapted to transport the sheet through the reversion module without deceleration in the process direction.

12. The apparatus of claim 7 wherein the system is an electrophotographic system.

13. A reversion module for an object handling system comprising:
    a first channel adapted to receive the object having a first surface in a face up orientation;
    a curved channel section adapted to change an orientation of the object wherein the first surface is in a face down orientation and a second surface is in a face up orientation; and
    a second channel adapted to receive the object from the curved channel and output the object to the object handling system; and
    a fluid transport system adapted to move the object through the reversion module.

14. The reversion module claim 13 wherein the module is adapted to maintain a first edge of the object as the object is received in the first channel as a leading edge of the object as the object is outputted from the second channel.

15. A method for reverting an object in an object handling system comprising the steps of:
    inputting the object into a reversion module;
    reverting the object in the module spiraling the object through a reversion channel, wherein the first surface of the object in a face-up orientation is reverted into a face-down orientation while maintaining a first edge of the object as a leading edge if the object; and
    outputting the reverted object to the object handling system.

16. The method of claim 15 to further comprise the steps of using a fluid transport system to move the object through the reversion module.

* * * * *